Figure 5:
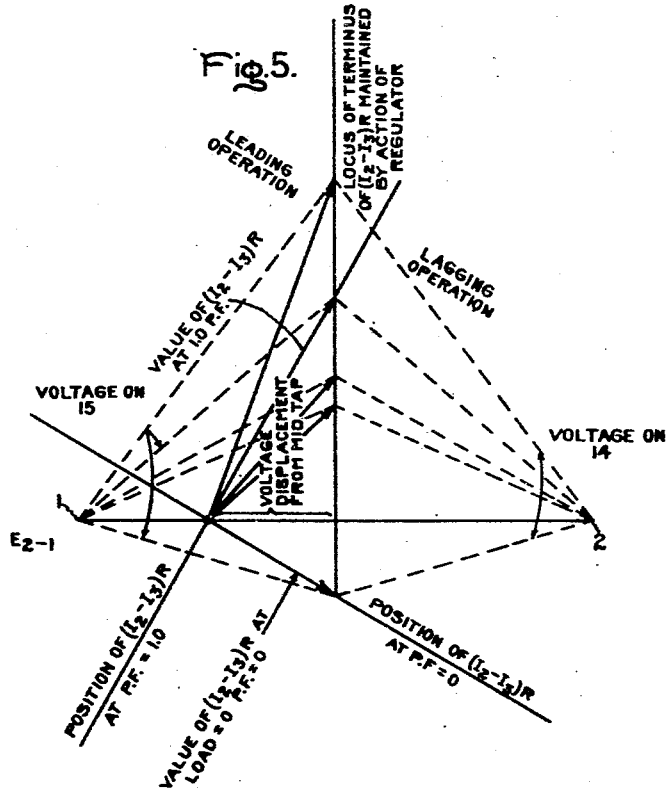

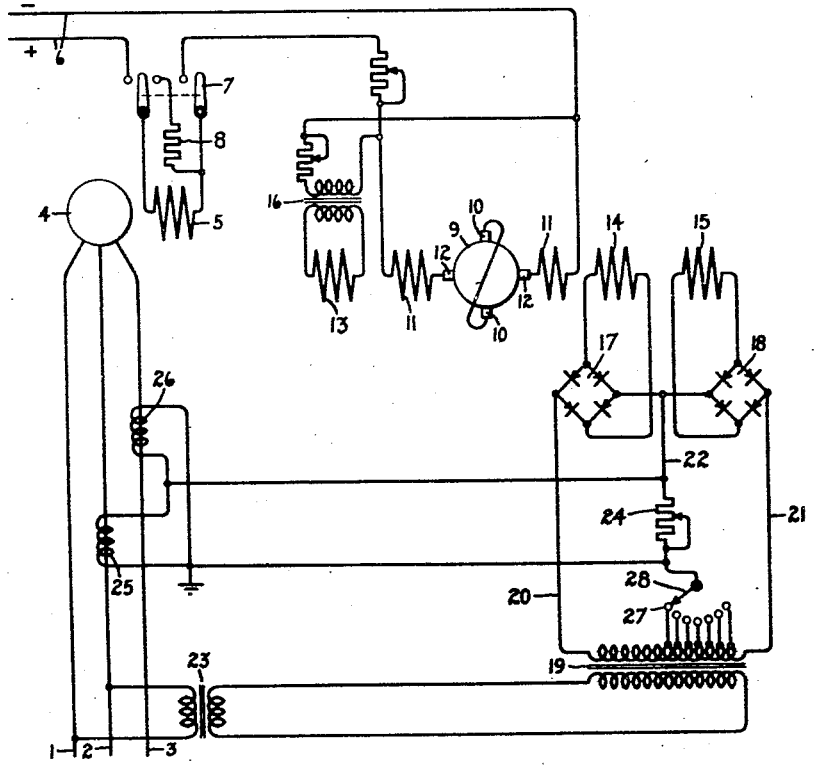
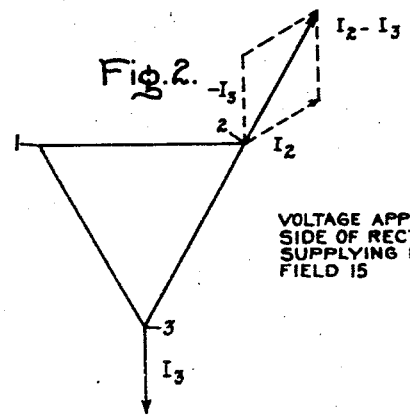
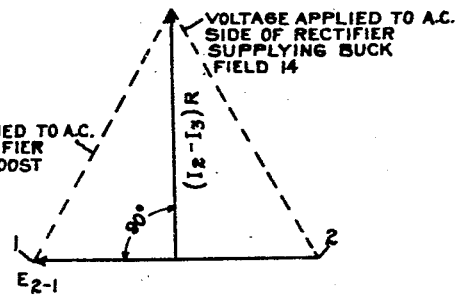
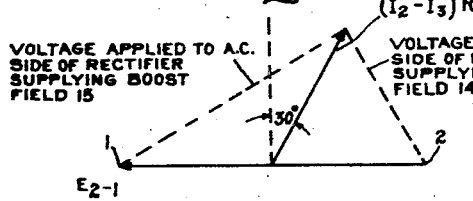

Inventors:
Frederick E. Crever,
Leonard C. Calder,
by Harry E. Dunham
Their Attorney.

Patented Dec. 10, 1946

2,412,442

UNITED STATES PATENT OFFICE 2,412,442

REGULATOR SYSTEM

Frederick E. Crever, Scotia, N. Y., and Leonard C. Calder, Catonsville, Md., assignors to General Electric Company, a corporation of New York Application July 1, 1943, Serial No. 493,084

9 Claims. (Cl. 172—246)

This invention relates to regulator systems and more particularly to improvements in wattless current regulator systems for alternating-current circuits.

It is often desirable to be able to control automatically the wattless current in an alternating-current circuit. For example, it is sometimes desirable to vary the wattless current in proportion to the active component of the current so as to maintain constant power factor for various loads on the circuit. At other times it may be desirable to maintain constant wattless current or reactive power for wide variations in actual load or total current in the circuit. Under still other conditions it may be desirable to combine these two types of regulation so that under certain load conditions the reactive power is held constant, whereas under other load conditions the power factor is maintained constant and for intermediate loads both the power factor and the reactive power change. An example of the latter case is a synchronous motor which is subjected to continually changing wide load variations. Such operation is often encountered on electric shovels where the synchronous motor is the main power supply means of the shovel and usually drives a Ward-Leonard set or its equivalent. By controlling the excitation of such a motor according to the latter type of regulation it can at no load be made to draw a definite amount of lagging reactive kva. and as the load increases the reactive lagging kva. decreases so that the power factor increases for two reasons, namely, the increase in the active component of the current and the decrease in the reactive component of the current until at a predetermined value of load the power factor is unity and as the load increases further the reactive current reverses and becomes leading so that the power factor decreases but in the leading direction. Such control substantially eliminates fluctuations in voltage on the alternating-current power supply system as a result of variations in load on the synchronous motor.

An object of the invention is to provide a new and improved electrical regulator.

Another object of the invention is to provide a new and improved wattless current regulator for alternating-current circuits.

A further object of the invention is to provide an adjustalbe regulator which can hold either constant power factor or constant reactive kva. or a schedule of power factors depending upon the load so as to give a characteristic which varies between constant power factor and constant reactive kva.

The invention will be better understood from the following description taken in connection with the accompanying drawings and its scope will be pointed out in the appended claims.

Figure 6:
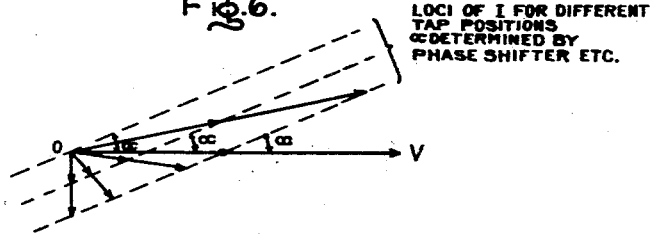
Figure 7:
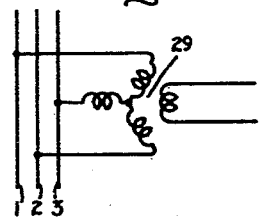
Figure 8:
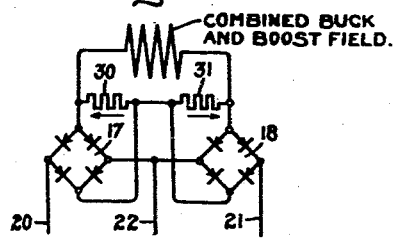

In the drawings Fig. 1 illustrates diagrammatically an embodiment of the invention, Figs. 2, 3, 4, 5 and 6 are vector diagrams for explaining the operation of the invention, and Figs. 7 and 8 are detailed views of modifications of the invention.

Referring now to the drawings and more particularly to Fig. 1, there is shown therein a three-phase alternating-current power circuit having conductors 1, 2 and 3 and it is assumed that the phase sequence of this circuit is 1—2—3. Connected to the circuit is an apparatus for causing variable amounts of active and wattless currents to flow in the circuit. This means is shown by way of example as a synchronous motor 4 having a field winding 5. This field winding is energized from a suitable source of direct current such as from the supply circuit 6 through a switch 7 which is arranged to connect the field winding across a discharge resistor 8 when the field circuit is opened. The excitation of the machine 4 is controlled in any suitable manner such as by a buck and boost generator 9 connected in series with the field winding 5. This machine is shown by way of example as an amplidyne-generator having a pair of short circuited brushes 10 for providing the main armature reaction excitation of the machine and being provided with series compensating field windings 11 in circuit with its load brushes 12. In addition, the machine is provided with an anti-hunt winding 13 and a pair of buck and boost control windings 14 and 15. In order to secure proper anti-hunt action of the winding 13 it is energized only during changes in voltage of the amplidyne-generator by connecting it across this generator through a stabilizing transformer 16.

For energizing the buck and boost windings 14 and 15 differentially in accordance with electrical conditions in the main power circuit these windings are energized in accordance with both the voltage and the current of the main power circuit through individual rectifiers 17 and 18. These rectifiers have input terminals which are connected in series across the secondary winding of a transformer 19 by means of conductors 20 and 21 and a jumper 22. The transformer 19 is excited in accordance with the voltage of the main power circuit and, as shown, it is connected between the line conductors 1 and 2 through a conventional potential transformer 23.

The current response is obtained by creating a voltage drop in an impedance which corresponds in magnitude and phase with the current in the main circuit and inserting this voltage drop between the junction of the input terminals of the rectifiers, namely, the jumper 22, and an intermediate point on the secondary winding of the transformer 19. The impedance is shown by way of example as a resistor 24 and the voltage drop in this resistor is obtained by circulating a current in it which is the vector difference between the currents in lines 2 and 3 in the main circuit, this vector difference being obtained by current transformers 25 and 26 whose secondary windings are connected across the resistor 24 in such a manner that the current which flows in resistor 24 is the vector difference between the currents in the two secondary windings.

For adjusting the characteristics of the regulator the intermediate point in the secondary winding of the transformer 19 to which the resistor 24 is connected is made adjustable by means of a plurality of taps in this winding which terminate in tap contacts 27 which are selectively engaged by a tap switch 28.

The operation of Fig. 1 can best be understood by reference to the vector diagrams. Fig. 2 shows the vector relations between the line to line voltages and phase currents of the main power circuit during unity power factor conditions and shows that the vector difference between I₃, corresponding to the current in conductor 3, and I₂, corresponding to the current in conductor 2, is thirty degrees out of quadrature with the voltage between lines 1 and 2.

As the vector difference current flows through resistor 24, the voltage drop in 24 will be in phase with this resultant current so that Fig. 3 shows the relation between the input voltages of the rectifiers 17 and 18 when tap switch 28 is connected to the mid-tap or mid-point of the secondary winding of the transformer 19. As will be seen, the voltage applied to the boosting field 15 is greater than the voltage applied to the bucking field 14 so that the amplidyne-generator will boost the excitation of the synchronous motor, thus advancing the phase of its current. This will continue until the inequality in voltage applied to the two control field windings is virtually eliminated and, as shown in Fig. 4, this will occur when the voltage drop in the resistor 24 is virtually at right angles to the line voltage component of the energization of the rectifiers because then the voltages across the two rectifiers will be equal. As will be seen from a comparison of Figs. 3 and 4, this represents an advance in phase of the current by thirty degrees so that with the particular setting of the regulator shown in the drawing it will automatically tend to hold thirty-degree or .866 leading power factor of the synchronous motor 4. Thus, as long as the current difference stays at right angles to the voltage, the two voltages applied to the rectifiers are equal so that the current may increase and decrease along the vertical line shown in Fig. 4 without unbalancing the regulator. If, however, the current departs from the thirty-degree leading power factor, there will be a differential excitation of the amplidyne-generator and this will be in such direction as to restore the balance or equality of the energization of the two control field windings 14 and 15.

Assume now that the tap switch 28 is moved away from the mid-tap. This will produce a change in the vector diagram, as shown in Fig. 5. The shifting of the point of connection of the resistor 24 with the secondary winding of the transformer 19 is equivalent to retarding the phase of the current. That is to say, the energizations of the two control field windings 14 and 15 will only be equal when the current in the resistor 24 has been retarded in phase with respect to the angle it had in Fig. 4. Thus, in Fig. 5 the tap connection has been shifted to such an extent that unity power factor operation will result when the voltage drop across the resistor 24 is displaced thirty degrees from the position shown in Fig. 4 and it will be seen that this corresponds to the angular relationship illustrated in Fig. 3. If now the load on the synchronous motor decreases, the regulator automatically holds the current to such a magnitude and phase that the energizations of the buck and boost windings are virtually equal so that the vector representing the voltage across the resistor 24 has its locus on the perpendicular bisector of the voltage vector 1—2 with the result that the current will become more and more lagging; in other words, the power factor will decrease in the lagging direction until at no load the voltage drop across the resistor 24 will be at right angles to the unity power factor voltage drop indicating that a definite amount of zero power factor lagging wattless current will be maintained in the synchronous motor at no load. For increases in load above the unity power factor point the power factor will become leading, as shown in Fig. 5.

Another way of representing the operation of the regulator is shown in Fig. 6 in which the horizontal vector V represents the voltage of the supply circuit and the parallel dashed sloping lines represent the loci of the current in the main supply circuit for different settings of the tap switch 28. The sloping dashed line passing through the common origin zero of the voltage and current vectors represents the operation when the tap switch is on the mid-tap of the secondary winding of the transformer 19 and as will be seen this represents a condition of constant power factor operation, the power factor being thirty degrees leading. As the tap switch is moved to the right, as shown in Fig. 1, the dashed line will be displaced perpendicular to itself and downwardly, as shown in Fig. 6, thereby causing the phase of the current to vary between ninety-degree lagging at no load and unity power factor at an intermediate value of load, this increase in power factor being accompanied by simultaneous increases in load component of the current and decreases in lagging wattless component of the current. As the load increases further, the power factor becomes leading and decreases from unity.

The angle α between the sloping dashed lines and the voltage vector may be readily adjusted by shifting the phase of the energization of the transformer 19 with respect to the energization of the resistor 24. For example, as shown in Fig. 7, a rotary transformer type phase shifter may be substituted for the potential transformer 29. This device may consist of a polyphase stator whose terminals are connected to the lines 1, 2 and 3 and a single-phase rotor whose terminals are connected to the primary winding of the transformer 19. The stator produces a rotating magnetic field which induces a voltage in the rotor and the phase of this voltage with respect to any one of the phase or line-to-line voltages of the supply circuit may readily be adjusted by adjusting the angular relation of the rotor to the stator. As mentioned above, such angular adjustment will adjust the angle of the parallel current loci with respect to the voltage vector V in Fig. 6.

It will be observed that in Figs. 3 and 4 the voltage applied to the boost field winding 15 is proportional to the vector difference between two alternating voltages, these being respectively half the voltage of the secondary winding of transformer 19 and the voltage drop in the resistor 24, whereas the voltage applied to the buck field winding 14 is proportional to the vector sum of two alternating voltages, these being respectively the other half of the voltage of the secondary winding of transformer 19 and the voltage drop in resistor 24. However, this is not an essential feature of the invention and it will be obvious that the operation would be just the same if the phase of the voltage drop in the resistor 24 were reversed by reversing its connections or the phase of the voltage of the secondary winding of transformer 19 were reversed by reversing its connections, although in that case the voltage applied to the boost field would then correspond to the vector sum of two voltages and the voltage applied to the buck field would correspond to the vector difference of two voltages. Furthermore, if the secondary winding of transformer 19 were divided into two equal coils so that their relative series connections could be reversed, the voltages applied to the buck and boost coils could both be proportional to the vector sum of two voltages or could both be proportional to the vector difference of two voltages.

Furthermore, the invention is not limited to the use of separate buck and boost field coils and the outputs of the rectifiers 17 and 18 can be passed through associated resistors 30 and 31 and a combined buck and boost field winding could be connected to be responsive to the difference between the voltage drops across these resistors by connecting it across the two resistors in series, as shown in Fig. 8. In this manner when the circuit is balanced, as shown in Fig. 4, the voltage drops in resistors 30 and 31 would be equal so that the energization of the combined buck and boost field winding would be zero. As the voltage applied to one rectifier predominated that of the other, the voltage drops in the resistors 30 and 31 would be unequal so that a current would flow through the combined buck and boost field winding in a direction corresponding to whichever voltage was the larger.

It will be noted from Fig. 2 that at unity power factor of the main circuit the current in line conductor 3 is at right angles to the line-to-line voltage between conductors 2. Consequently, if current transformer 25 were omitted from Fig. 1 the system would automatically maintain unity power factor with the tap switch 28 on the midtap, as shown in the drawings. In other words, Fig. 4 would then be representative of operating conditions when the vertical resistance voltage drop vector was produced by the current $I_3$ alone flowing in resistor 24 and as this voltage would be at right angles to the voltage $E_{2-1}$ at unity power factor the system would be balanced at this power factor.

When the phase shifter 29 is used it is, of course, unnecessary to use more than one current transformer as the phase shifter can be used to produce the desired angular relation between the current and voltage vectors. As it is immaterial whether the phase of the supply voltage or the phase of the supply current to the regulator is shifted, it will be obvious that the phase shifter 29 can be used in the current circuit for supplying the resistor 24 as well as in the potential circuit for supplying the transformer 19.

It is interesting to note that if the phase shifter is operated so as to rotate the current loci in Fig. 6 until they are parallel to the voltage vector and if the tap switch 28 is operated from its mid-position so as to displace these loci from the voltage vector, then the regulator will act to hold constant reactive power with variations in load because the quadrature component of the current will then necessarily be constant.

While there have been shown and described particular embodiments of this invention, it will be obvious to those skilled in the art that various changes and modifications can be made therein without departing from the invention, and therefore, it is aimed in the appended claims to cover all such changes and modifications as fall within the true spirit and scope of the invention.

What we claim as new and desire to secure by Letters Patent of the United States is:

1. In combination, a three-phase alternating-current circuit, a synchronous dynamo-electric machine connected thereto, excitation controlling means for said synchronous machine including a pair of differentially acting control windings, individual rectifiers for each of said control windings, said rectifiers having alternating-current input terminals, a third winding across which the alternating-current input terminals of said rectifiers are connected in series, means for exciting said third winding in accordance with the voltage of said circuit, and means for inserting an alternating voltage responsive in magnitude and phase to the current in said circuit between the junction of the input terminals of said rectifiers and an intermediate point on said third winding.

2. In combination, a three-phase alternating-current circuit, a synchronous dynamo-electric machine connected thereto, excitation controlling means for said synchronous machine including a pair of differentially acting control windings, individual rectifiers for each of said control windings, said rectifiers having alternating-current input terminals, a third winding across which the alternating-current input terminals of said rectifiers are connected in series, means for exciting said third winding in accordance with the voltage of said circuit, means for inserting an alternating voltage responsive in magnitude and phase to the current in said circuit between the junction of the input terminals of said rectifiers and an intermediate point on said third winding, and means for shifting the position of said intermediate point.

3. In combination, a three-phase alternating-current circuit, a synchronous dynamo-electric machine connected thereto, excitation controlling means for said synchronous machine including a pair of differentially acting control windings, individual rectifiers for each of said control windings, said rectifiers having alternating-current input terminals, a third winding across which the alternating-current input terminals of said rectifiers are connected in series, means for exciting said third winding in accordance with the voltage of said circuit, means for inserting an alternating voltage responsive in magnitude and phase to the current in said circuit between the junction of the input terminals of said rectifiers and an intermediate point on said third winding, and means for shifting the phase relation of the excitation of said third winding with respect to the voltage of said circuit.

4. In combination, an alternating current power circuit, a dynamo-electric machine connected thereto, regulating means responsive to the voltage and current of said machine for automatically varying the excitation of said machine to maintain a predetermined phase relationship between said voltage and said current, said regulating means including a voltage responsive transformer having a primary winding energized from said power circuit, a secondary winding for said voltage transformer having an intermediate tapped point for obtaining two control potentials opposite in phase, a current responsive transformer for obtaining a voltage proportional to power circuit current, means for adding said current proportional voltage to said control potentials, and means for varying the position of said intermediate point on said voltage responsive transformer to unbalance the magnitude of said control potentials.

5. In combination, a three phase alternating current circuit, a synchronous dynamo-electric machine connected thereto, excitation controlling means for said synchronous machine including a reversible polarity control winding, a pair of rectifiers of opposed polarity for energizing said control winding, said rectifiers having alternating current input terminals, a second winding across which the alternating current input terminals of said rectifiers are connected in series, means for exciting said second winding in accordance with the voltage of said circuit, and means for inserting an alternating voltage responsive in magnitude and phase to the current in said circuit between the junction of the input terminals of said rectifiers and an intermediate point on said second winding.

6. In combination, a three phase alternating current circuit, a synchronous dynamo-electric machine connected thereto, excitation controlling means for said synchronous machine including a reversible polarity control winding, a pair of rectifiers of opposed polarity for energizing said control winding, said rectifiers having alternating current input terminals, a second winding across which the alternating current input terminals of said rectifiers are connected in series, means for exciting said second winding in accordance with the voltage of said circuit, means for inserting an alternating voltage responsive in magnitude and phase to the current in said circuit between the junction of the input terminals of said rectifiers and an adjustable intermediate point on said second winding, and means for shifting the phase relation of the excitation of said second winding with respect to the voltage of said circuit.

7. Electric circuit regulating apparatus comprising in combination, an alternating current circuit, apparatus connected to said circuit for effecting the flow in said circuit and in said apparatus of a variable magnitude and variable phase current, control means for said apparatus including a pair of differentially acting control windings and a pair of rectifiers connected for supplying unidirectional current thereto, and means responsive to the phase relationship and magnitude of current and voltage in said circuit for energizing said rectifiers including a first transformer responsive to magnitude and phase of circuit voltage and a second transformer responsive to magnitude and phase of circuit current, said first transformer having an adjustable voltage secondary winding.

8. Electric circuit regulating apparatus comprising in combination, an alternating current circuit, apparatus connected to said circuit for effecting the flow in said circuit and in said apparatus of a variable magnitude and variable phase current, control means for said apparatus including a pair of differentially acting control windings and a pair of rectifiers connected for supplying unidirectional current thereto, means responsive to the phase relationship and magnitude of current and voltage in said circuit for energizing said rectifiers including a first transformer responsive to magnitude and phase of circuit voltage and a second transformer responsive to magnitude and phase of circuit current, and means interposed between said second transformer and said electric circuit for shifting the phase relationship between said circuit voltage and said second transformer output voltage.

9. Electric circuit regulating apparatus comprising in combination, an alternating current circuit, apparatus connected to said circuit for effecting the flow in said circuit and in said apparatus of a variable magnitude and variable phase current, control means for said apparatus including an electrically reversible control winding and rectifier means connected thereto for energizing said winding with direct current of reversible polarity, means responsive to the phase relationship and magnitude of current and voltage of said circuit for energizing said rectifier means including a first transformer responsive to magnitude and phase of circuit voltage and a second transformer responsive to magnitude and phase of circuit current, and means interposed between said electric circuit and said second transformer for shifting the phase relationship between said circuit voltage and second transformer output voltage.

FREDERICK E. CREVER.
LEONARD C. CALDER.